O. F. THOMAS.
Pitmen.

No. 141,902.　　　　　　　　　　　Patented August 19, 1873.

Witnesses.　　　　　　　　　　Inventor.
　　　　　　　　　　　　　　　　Oscar F. Thomas
Thomas Dermody　　　　　　　　by
　　　　　　　　　　　　　　　William H. Low
　　　　　　　　　　　　　　　　his Attorney.

AM. PHOTO-LITHOGRAPHIC CO. N.Y. (OSBORNE'S PROCESS)

UNITED STATES PATENT OFFICE.

OSCAR F. THOMAS, OF BARNES' CORNERS, ASSIGNOR TO HIMSELF, ARNOLD C. HUGHS, OF RODMAN, AND ANDREW J. GLASURE, OF PINKNEY, N. Y.

IMPROVEMENT IN PITMEN.

Specification forming part of Letters Patent No. 141,902, dated August 19, 1873; application filed November 8, 1872.

*To all whom it may concern:*

Be it known that I, OSCAR F. THOMAS, of Barnes' Corners, in the county of Lewis and State of New York, have invented certain Improvements in Pitman-Rods, of which the following is a full and exact description, reference being had to the accompanying drawings making a part of this specification, in which—

Figure 1:
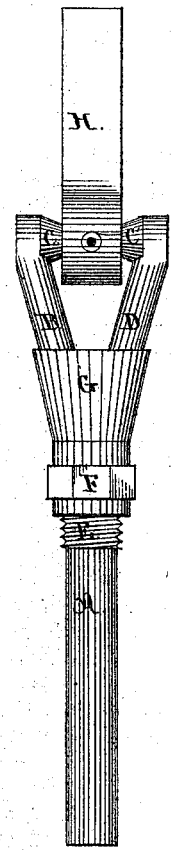
Figure 2:
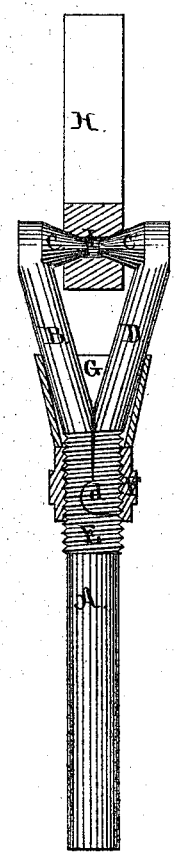

Figure 1 is a plan view of one end of my improved rod; and Fig. 2 is the same with the nut, collar, &c., shown in section.

The nature of my invention relates more particularly to pitman-rods for mowing-machines, but it may be adapted to other kinds of machinery where a cheap and simple means of taking up the wear of the joints is desirable; and it consists of the devices herein shown and described.

My improvement, as shown in the drawings, consists of the rod A, having a prolongation, B, forming one part of the forked end of the rod, and terminating in a conical point, C, at right angles to the center line of the rod. D is an adjustable piece forming the other part of the forked end of the rod; also, terminating in a conical point, C', corresponding to and in line with the point C. It is fitted into the body of the rod, so as to form a working joint, $d$, therewith. Around the junction of the two parts A and D, and covering the joint $d$, a screw-thread, E, is cut, upon which the nut F works. This nut bears against a conical collar or sleeve, G, fitted over the two inclined parts of the forked end, for the purpose of drawing the conical points C C' closer together to adjust them to take up the lost motion occasioned by the wear of the various parts. H is a strap end, (to be secured to the cutter-bar, or such other part of the machinery as it is required to impart motion to.) It has the ends of the hole I running through it formed to receive the conical points C C'. The points C C' are inserted into the hole I of the strap end H, and the collar G is forced, by the nut F, up the inclined sides of the forked end of the rod, carrying the points C C' in until they are held in proper contact with the beveled sides of the hole I. As these parts become worn the conical points are forced farther into the hole, thereby taking up the lost motion, and overcoming the noise and rattle consequent upon the use of pitman-rods wherein no such adjustment is provided for.

I am aware that pitman-rods having two branches provided with conical points have heretofore been made and used; therefore, I do not broadly claim such a construction of them; but

What I claim as my invention is—

The combination of the rod A and adjustable piece D, having conical points C C', with the nut F and collar G, when constructed and arranged to operate as and for the purpose herein specified.

OSCAR F. THOMAS.

Witnesses:
LEWIS H. JONES,
A. L. NICHOLS.